F. DEDOLPH.
Attachment for Coal-Stoves.
No. 205,842. Patented July 9, 1878.
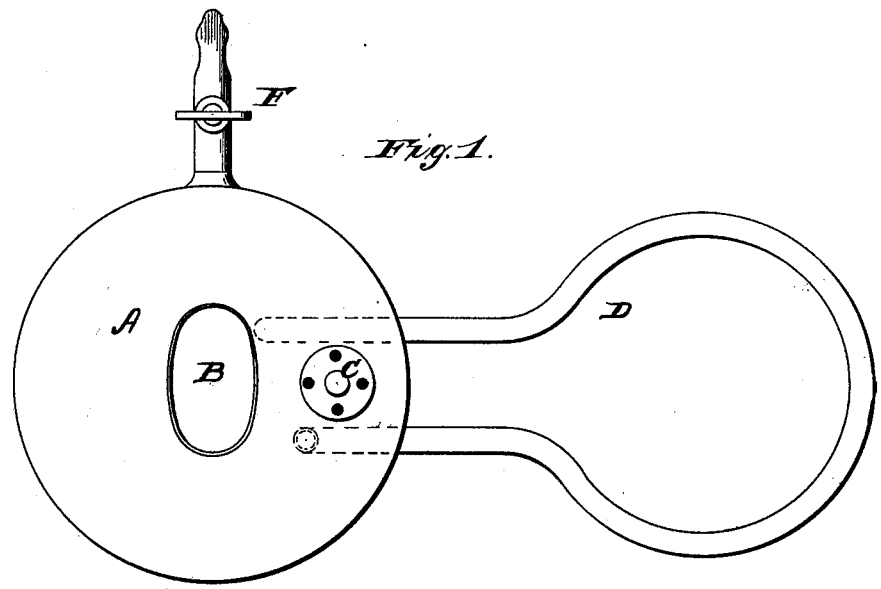
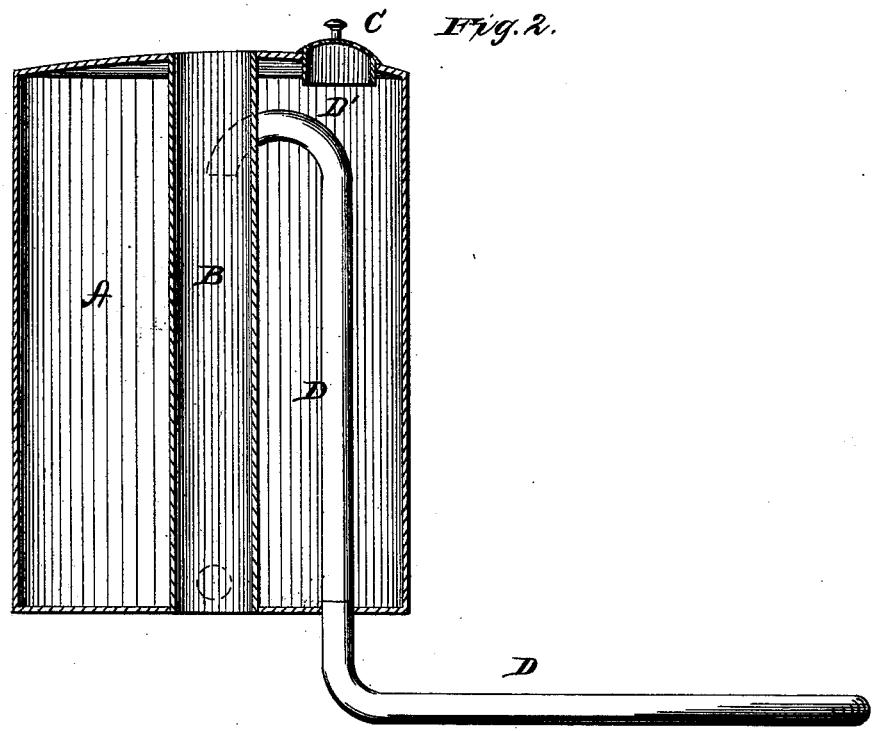
WITNESSES
Franck L. Ouraud
Harry A. Toulmin
INVENTOR
Fred Dedolph. M.D.
By Alexander Mason
Attorneys

UNITED STATES PATENT OFFICE.

FREDERICK DEDOLPH, OF ST. PAUL, MINNESOTA.

IMPROVEMENT IN ATTACHMENTS FOR COAL-STOVES.

Specification forming part of Letters Patent No. 205,842, dated July 9, 1878; application filed April 8, 1878.

*To all whom it may concern:*

Be it known that I, FREDERICK DEDOLPH, of St. Paul, in the county of Ramsey, and in the State of Minnesota, have invented certain new and useful Improvements in Attachments for Coal-Stoves; and do hereby declare that the following is a full, clear, and exact description thereof, reference being had to the accompanying drawings, and to the letters of reference marked thereon, making a part of this specification.

The nature of my invention consists in the construction and arrangement of an evaporator as an attachment for coal-stoves, for the purpose of moistening the air, as will be hereinafter more fully set forth.

In order to enable others skilled in the art to which my invention appertains to make and use the same, I will now proceed to describe its construction and operation, referring to the annexed drawing, in which—

Figure 1 is a plan view of my evaporator for coal-stoves, and Fig. 2 is a central vertical section of the same.

A represents a cylindrical or other suitably-shaped vessel provided with a central tube, B, passing entirely through the vessel from top to bottom, to form a section of the stove-pipe or to allow the stove-pipe to pass through it.

In the top of the vessel A is an opening, with a perforated cap, C, to allow the vapor to pass out into the room.

D is a pipe, which is intended to have suitable couplings and joints, so as to pass around the feeder of the stove. Both ends of the pipe D enter the bottom of the vessel A, one end stopping immediately above the bottom, while the other end extends nearly to the top, and is curved over, as shown at D′ in Fig. 2.

Water introduced into the vessel A will pass through the pipe D, and become heated, when a continuous circulation of the water is obtained, and all the vapor passes out through the perforated cap C.

One end of the pipe D terminating immediately above the bottom of the vessel A, and the other end of said pipe extending nearly to the top of said vessel, and curving downward, as shown at D′, it will be seen that the water from the bottom of the vessel A will pass down through one end of the pipe D, become heated during its passage through said pipe, and be discharged in the form of hot water or steam through the elongated and curved end of said pipe into the vessel again, thus forming a constant circulation of the water through the pipe.

The end D′ of the pipe D being curved downward, as shown, prevents the steam from acting forcibly against the top head of the vessel A, but causes it to be discharged against and into the water, and thus be condensed, and preventing any damage that might otherwise occur by a too great pressure of steam.

F is a faucet at or near the bottom of the vessel A, to draw off the water when desired.

By the use of this evaporator a more healthful atmosphere is produced in closed rooms, caused by the impregnation of the air with moisture through the evaporator. This is of great importance in sick-rooms. It has also beneficial effect on plants kept indoors during the winter months.

I am aware that it is not new to apply a drum or boiler directly to a stove-pipe, and I do not claim such, broadly, as my invention.

Having thus fully described my invention, what I claim as new, and desire to secure by Letters Patent, is—

The pipe D arranged to pass around the feeder or magazine of a coal-stove, having one end opening immediately above the bottom of the vessel A, and the other end passing through the bottom to near the top, and curved downward, as shown at D′, in combination with said vessel A, the central pipe B, and the perforated cap C, substantially as and for the purposes herein set forth.

In testimony that I claim the foregoing I have hereunto set my hand this 4th day of March, 1878.

DR. FRED. DEDOLPH.

Witnesses:
AD. STEAB,
F. LINZ.